(No Model.)
T. A. EDISON.
INCANDESCENT ELECTRIC LAMP.
No. 317,632. Patented May 12, 1885.
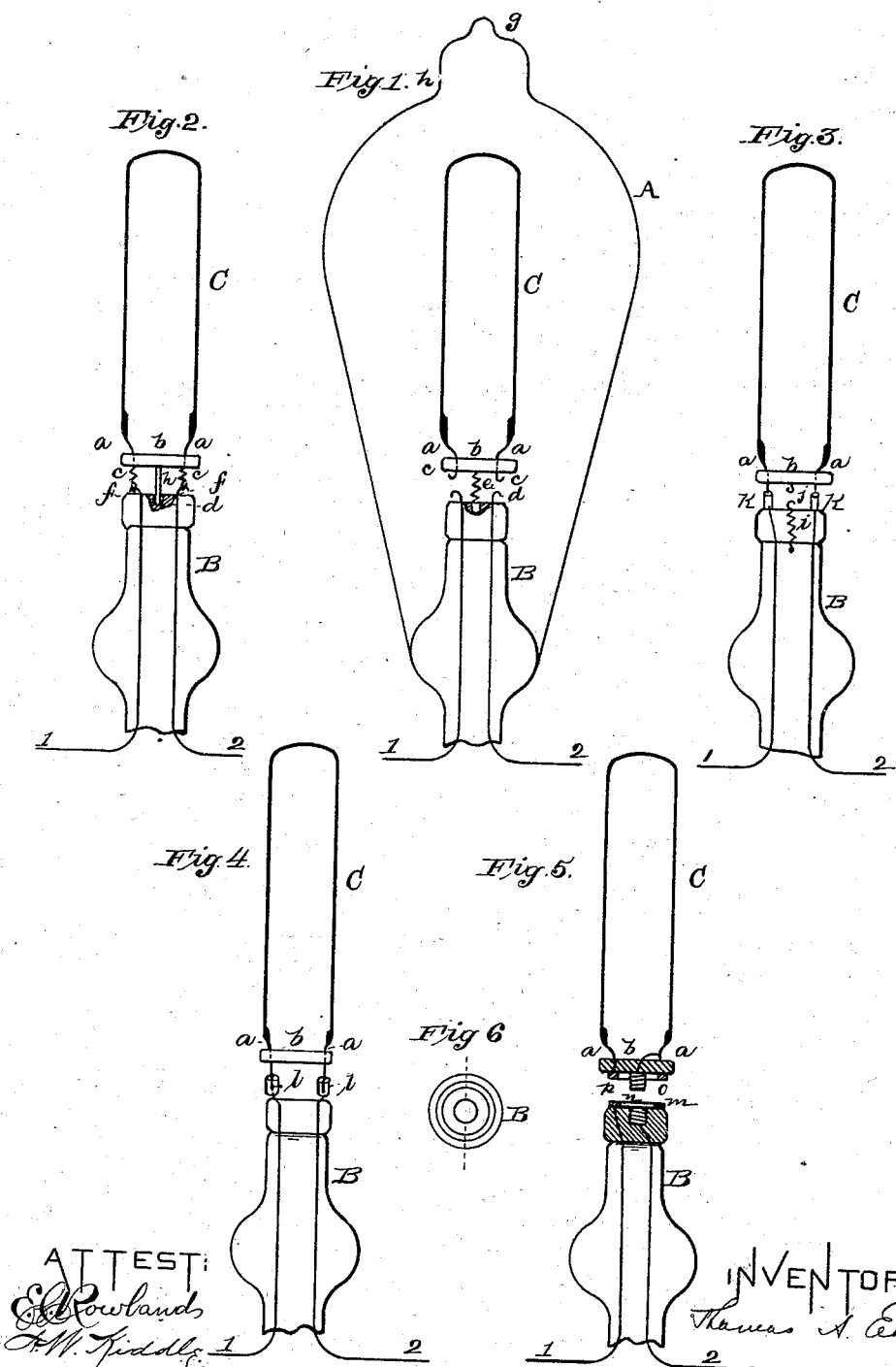

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

INCANDESCENT ELECTRIC LAMP.

SPECIFICATION forming part of Letters Patent No. 317,632, dated May 12, 1885.

Application filed November 9, 1882. (No model.)

*To all whom it may concern:*

Be it known that I, THOMAS A. EDISON, of Menlo Park, in the county of Middlesex and State of New Jersey, have invented a new and useful Improvement in Incandescent Electric Lamps, (Case No. 506,) of which the following is a specification.

In the use of incandescing electric lamps it may be sometimes desired after a carbon filament has become broken or worn out to substitute another therefor, using the glass and metallic portions of the lamp over again with the new filament.

The object of my invention is to render the process of substitution as simple and convenient as possible; and to this end the invention consists, principally, in making removable connections between the carbon and the leading-in wires of the lamp, such connections being so formed that good electrical contact as well as rigid and durable mechanical connections will be maintained, and the operations of connecting and disconnecting will be simple and convenient. Preferably, I make the connection by forming the ends of the leading-in wires into hooks and attaching small wires to the ends of the carbon, the ends of which are formed into corresponding hooks; or eyes may be used instead of hooks in one case or the other. Springs should be used in connection with the wire-support and the filament to keep the hooks or hooks and eyes in close contact with each other. Instead of this I may attach to the end of each leading-in wire a split tube of metal, the ends of the short wires attached to the carbon being pressed down into the tubes, such ends being bent out through the splits and the carbon held thus securely, but so as to be readily withdrawn; or a hook may be placed at the end of a spring projecting above the glass wire-support of the lamp, and a corresponding hook be attached to the bottom of an insulating piece, (preferably of glass,) through which pass the short wires attached to the carbon. The ends of the leading-in wires would be attached to metal tubes projecting up from the wire-support, and the ends of the wires attached to the carbon will enter these tubes, fitting closely therein.

Instead of using hooks and springs I may place on the top of the wire-support a platinum ring, and set in the center of said support, within the ring, a screw-threaded platinum thimble. Short wires are attached to the carbon, as above, and a glass disk extends across supporting such wires. A platinum ring and a screw-threaded platinum plug are attached to the lower side of said glass disk, one of the wires attached to the carbon being connected with the ring and the other with the plug. The plug is screwed into the thimble on the wire-support, the glass disk being held by a suitable tool for this purpose, whereby circuit is completed through the filament. With all these forms the projection at the top of the globe must be of such diameter that when its top is removed an opening will be left of sufficient size to allow the withdrawal of the old carbon and admission of a new one.

The above may be better understood by reference to the drawings, in which Figures 1, 2, 3, 4, and 5 represent different forms of my invention, and Fig. 6 a top view of the glass wire-support of Fig. 5.

Like letters refer to corresponding parts in all these figures.

In Fig. 1, A is the inclosing globe; B, the inner tube or wire-support, through which pass the leading in wires 1 2; and C the flexible carbon filament. Short wires $a\,a$ are connected with the ends of the filament, and such wires pass through a glass piece or disk, $b$, their ends being formed into hooks $e\,e$.

In the solid end portion of the inner tube, B, is formed a hole or socket, $d$, and a spring, $e$, is attached to the piece $d$ immediately above such hole or socket. The ends of the leading-in wires 1 2 are formed into hooks $f\,f$. Originally, of course, the filament is attached to the inner stem, B, the hooks $c\,c$ and $f\,f$ being connected, and the springs $e$ entering the hole $d$, and such stem is passed through the bottom of the globe and fused to said globe, the globe then being exhausted from the top and sealed off at $g$.

The globe is constructed, as shown, with a projection, $h$, of sufficient diameter to permit the carbon filament to pass through it, and terminating in a tip, $g$. If it is desired to substitute a new filament for the old one, the tip $g$ is broken off and the air allowed to enter the globe. The glass is then cut away from the upper part of projection $h$, so that an aperture is left, through which a suitable tool may be passed to grasp the glass piece $b$. Such piece $b$ being pressed down, the hooks can be disengaged and the filament removed. The new filament, provided with the hooked wires $a\,a$ and glass piece $b$, is then placed in the globe from above, the spring $e$ entering the hole $d$, and being compressed therein until the hooks are connected, when the tool is removed, and the tension of the spring holds the hook in good contact. A glass tube should then be fused to the globe at $g$, through which the air can be exhausted, such tube then being sealed off in the usual manner.

In the form illustrated in Fig. 2 the wires $a\,a$ themselves are formed into springs, and a pin, $h$, extending downwardly from disk $b$, enters the hole or socket $d$. The operation is of course the same.

In Fig. 3 a spring, $i$, is attached to the side of the stem B, and a hook, $j$, to the disk $b$. Metal tubes $k\,k$ extend up from stem B, and the ends of the wires $a\,a$ fit within such tubes, the tension of the spring keeping the wires in good contact with the tubes.

In Fig. 4 split metal tubes $l\,l$ are attached to the leading-in wires, and the wires $a\,a$ entering such tubes are bent out through the splits and held securely. By grasping the piece $b$ the filament may be lifted directly out.

In the form illustrated in Figs. 5 and 6 the top of stem B is provided with a platinum ring, $m$, and a screw-threaded platinum thimble, $n$. The glass disk $b$ has a platinum ring, $o$, and a screw-threaded platinum plug, $p$, attached to its under side.

The short wires $a\,a$ attached to the filament are connected, respectively, with the ring $o$ and plug $p$, and the leading-in wires 1 2 are connected, respectively, with ring $m$ and thimble $n$. The plug $p$ is screwed into thimble $n$, and the rings $m$ and $o$ are thus brought into contact.

It will be observed that in all forms of the removable connection the filament is held in a definite position relatively to the other parts of the lamp, no matter in what position said lamp may be placed.

What I claim is—

1. In an incandescing electric lamp, the combination, with the incandescing conductor, of an insulating piece attached to said conductor and metallic terminals supported by said insulating piece connected with said filament, and removably connected with the leading-in wires of the lamp, substantially as set forth.

2. The combination, with the incandescing conductor of an electric lamp and metallic terminals secured to said conductor and the leading-in wires of said lamp, of removable connections between said conductor-terminals and said wires within the lamp-globe, and a spring or springs whose tension acts to maintain electrical contact at such connections, substantially as set forth.

3. In an incandescing electric lamp, the combination, with the leading-in wires having their ends formed into hooks, of the incandescing conductor having corresponding hooks attached to its ends, and a spring or springs for maintaining electrical contact between the two pairs of hooks within the lamp-globe, substantially as set forth.

This specification signed and witnessed this 26th day of October, 1882.

THOS. A. EDISON.

Witnesses:
WM. H. MEADOWCROFT,
H. W. SEELY.